United States Patent [19]

Floyd et al.

[11] Patent Number: 5,229,478
[45] Date of Patent: * Jul. 20, 1993

[54] PROCESS FOR PRODUCTION OF HIGH MOLECULAR WEIGHT EPDM ELASTOMERS USING A METALLOCENE-ALUMOXANE CATALYST SYSTEM

[75] Inventors: Sigmund Floyd, Elizabeth; Elvin L. Hoel, Westfield, both of N.J.

[73] Assignee: Exxon Chemical Patents Inc., Linden, N.J.

[*] Notice: The portion of the term of this patent subsequent to Mar. 19, 2008 has been disclaimed.

[21] Appl. No.: 594,776

[22] Filed: Oct. 9, 1990

Related U.S. Application Data

[63] Continuation of Ser. No. 207,672, Jun. 16, 1988, abandoned.

[51] Int. Cl.$^5$ .................. C08F 4/64; C08F 236/20
[52] U.S. Cl. .................. 526/160; 526/127; 526/129; 526/282; 526/283; 526/336
[58] Field of Search ............... 526/160, 127, 129, 282, 526/283, 336

[56] References Cited

U.S. PATENT DOCUMENTS 4,542,199 9/1985 Kaminsky et al. .................. 526/160
4,791,180 12/1988 Turner .................. 526/160
5,001,205 3/1991 Hoel .................. 526/160 X

FOREIGN PATENT DOCUMENTS 121711 6/1987 Japan .

OTHER PUBLICATIONS

Kiaminsky, "Ethylene Propylene Diene Terpolymers Produced with a Homogeneous and Highly Active Z-rconium Catalyst," *J. Poly. Sci.*, vol. 23, pp. 2151-2164 (1985).

*Primary Examiner*—Fred Teskin
*Attorney, Agent, or Firm*—M. Susan Spiering; M. B. Kurtzman

[57] ABSTRACT

A process for producing a high molecular weight EPDM elastomer having low crystallinity using a bridged bis-metallocene-alumoxane catalyst wherein the metallocene component of the catalyst has the formula:

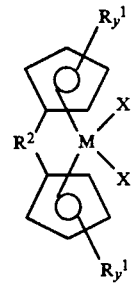

wherein "M" is titanium, zirconium or hafnium; each "$R^1$" independently is a $C_1$ to $C_{20}$ linear, branched or cyclic alkyl group or a $C_2$ to $C_4$ alkylene which forms a fused ring system; "$R^2$" is a $C_1$ to $C_6$ linear, branched or cyclic alkylene group, an alkyl substituted silanylene group or an alkyl substituted silaalkylene group; each "X" independently is a halogen, hydride, alkyl, aryl or chelating group, and "y" is an integer of 2 to 4.

33 Claims, No Drawings

PROCESS FOR PRODUCTION OF HIGH MOLECULAR WEIGHT EPDM ELASTOMERS USING A METALLOCENE-ALUMOXANE CATALYST SYSTEM

This is a continuation of application Ser. No. 207,162, filed Jun. 16, 1988, now abandoned.

FIELD OF THE INVENTION

This invention relates to a process for the production of high molecular weight EPDM elastomers using a bridged bis-radical metallocene-alumoxane catalyst system which provides medium to high levels of diene incorporation and conversion at high catalyst activity.

BACKGROUND OF THE INVENTION

Olefin-based elastomeric polymers may be produced by the proper copolymerization of ethylene, an α-olefin and a diene monomer. The most common such elastomers are copolymers of ethylene and propylene (EP elastomers) and terpolymers of ethylene, propylene, and diene, which are generally referred to as EPDMs. While ordinary EP elastomers can be cured through use of curatives such as organic peroxides, for cures using sulfur and sulfur-containing compounds, the presence of a diene is required. Hence, EPDM elastomers find use in numerous cured applications for which the EP copolymers are not suitable. Currently, EPDMs are commonly commercially produced with vanadium compound-organoaluminum catalyst systems.

EPDMs have many properties which make them desirable for applications for which other types of elastomers are not as well suited. EPDMs have outstanding weather and acid resistance, and high and low temperature performance properties. Such properties particularly suit EPDMs as an elastomer for use in hoses, gaskets, belts, bumpers; as blending components for plastics and for tire side walls in the automotive industry; and for roofing applications. Additionally, because of their electrical insulation properties, EPDMs are particularly well suited for use as wire and cable insulation.

Desirably, an EPDM elastomer should have a reasonably fast cure rate and state of cure; hence its diene content should be relatively high, preferably greater than about three weight percent. The cure rate for an EPDM elastomer and the final properties of the cured article depend upon the type of diene incorporated. For example, on a comparable diene weight percent basis, an EPDM produced with 5-ethylidene-2-norbornene (ENB) as the diene will have a faster cure rate in sulfur cures than an EPDM produced with dicyclopentadiene (DCPD), or 1,4-hexadiene (HD), whereas EPDMs with 1-4,hexadiene as the termonomer are known to exhibit good heat resistance. For many commercial applications an EP or EPDM elastomer should also have a low degree of crystallinity, measured by Differential Scanning Calorimetry (DSC) as a heat of fusion of 9 cal/g or less, preferably less than 3 cal/g, according to the technique described herein. For an EPDM material to be useful for most elastomer applications, it should have a weight-average molecular weight of at least about 110,000 or, expressed in terms of the Mooney viscosity ($ML_{1+8}$ at 127° C.), at least 10. In many applications it is further desirable that the molecular weight distribution of an EPDM should be characterized by a ratio of weight average molecular weight (Mw) to number average molecular weight (Mn), Mw/Mn, less than 5, preferably less than 3.

The heat of fusion of an EPDM is a commonly-used measure of its degree of crystallinity. This property is important in all practical applications of EPDMs because the degree of crystallinity is correlated with physical properties, such as the tensile strength, and also the processability and tack of the EPDM material. Since, in most commercial uses, elastomers are generally significantly higher in molecular weight than plastics, too much crystallinity makes an EPDM material very difficult to process at ordinary temperatures. Also, although good physical properties are of course desirable (e.g., in applications such as hose and tubing, or wire and cable), again, an excess of crystallinity causes an EPDM material to exhibit high hardness and stiffness and a surface with a "plastic-like" rather than a "rubbery" feel, and poor surface tack.

In most current EPDM production processes, the catalysts used for production of high molecular weight EPDM elastomers are soluble catalysts formed from vanadium compounds such as vanadium tetrachloride, vanadyl trichloride, vanadium acetylacetonate, or a vanadyl trialkoxy compound in conjunction with an organoaluminum compound. The activity of vanadium compound catalysts are generally low, e.g., 80–120 g polymer/mmol V.

In current commercial grades of EPDMs, crystallinity is a function of the ethylene content of the polymer and the catalyst system used for its production. For a given polymer composition, the catalyst system controls the fraction of ethylene units present in long ethylene sequences (long runs of ethylene units), which are capable of crystallizing. On the other hand, when a given catalyst system is used in a given reactor configuration, polymers with higher ethylene content will always have more long ethylene sequences, hence will be more crystalline. For current commercial EPDMs based on vanadium catalysts, the nature of this relationship is such that polymers are completely amorphous (non-crystalline) at ethylene contents below approximately 55 wt % and possess significant crystallinities (i.e., heat of fusion greater than approximately 0.05 cal/g) at ethylene contents of approximately 55 wt % or greater. The degree of crystallinity exhibits less dependence on the diene content of the EPDM material than on the percentage of ethylene. For an EP or EPDM produced by the vanadium catalyst system, $VOCl_3$-ethylaluminum sesquichloride for example, a heat of fusion (HOF) of roughly 3 cal/g is obtained at 67 wt % ethylene, while HOF is as high as 9 cal/g at 78 wt % ethylene. The HOF of an EPDM at a given ethylene content may be used to compare the crystallinity of polymers produced by a given catalyst system. In order for the catalyst system to be useful for commercial production of an EPDM elastomer, it is desirable for the crystallinity of the polymers to be roughly comparable to that of currently available commercial grades of EPDM.

Since the recent advent of metallocene-alumoxane coordination catalyst systems for the production of polyethylene and copolymers of ethylene and alpha-olefins (e.g., linear low density polyethylene), some effort has been made to determine the suitability of particular metallocene-alumoxane catalyst systems for the production of EPDM elastomers. For a metallocene-alumoxane catalyst system to be commercially useful for the production of EPDM elastomers, it should produce high yields of EPDM relative to the amount of catalyst in a reasonable polymerization time, and provide for adequate incorporation of a diene monomer, and preferably provide a nearly statistically random distribution of monomers in the polymer chain, while enabling good control of molecular weight over a wide range while yielding a relatively narrow molecular weight distribution.

Two publications have addressed the production of EPDM elastomers by processes using particular metallocene-alumoxane catalyst systems. Kaminsky, J. Poly. Sci., Vol. 23, pp. 2151–64 (1985) reports upon the use of a soluble bis(cyclopentadienyl) zirconium dimethylalumoxane catalyst system for toluene solution polymerization of elastomers containing ethylene, propylene, and ENB. Kaminsky employed this catalyst at low zirconium concentrations, high Al:Zr ratios and long reaction times to prepare, in low yields, high molecular weight EPDM elastomers having high ENB incorporation. Although of interest, the method by which Kaminsky reports such EPDM elastomers to be producible with a bis(cyclopentadienyl)zirconium dimethylalumoxane catalyst system is not suitable for commercial utilization. In particular, the long induction times required for Kaminsky's catalyst system to reach its full activity, a period on the order of hours without diene present, and longer with diene present, precludes commercial operation wherein such long residence times are economically infeasible.

Similar to Kaminsky, Japanese Kokai 62[1987]-121,711 illustrates the use of a soluble bis cyclopentadienyl) zirconium monohydride monochloride-alumoxane catalyst system for toluene solution polymerization of ethylene and butene-1 wherein, variously, 5-ethylidene-2-norbornene ENB), 5-vinylidene-2-norbornene (VNB), and dicyclopentadiene (DCPD) were employed as the diene. Japanese Kokai 121,711 further suggests, but does not illustrate, that the zirconocene component of the catalyst system may be a bis(indenyl) zirconium hydride or bis(tetrahydroindenyl) zirconium hydride rather than a bis cyclopentadienyl) zirconium hydride. Although Japanese Kokai 121,711 suggests that $\alpha$-olefins other than 1-butene can be employed, it illustrates only the production of an ethylene-butene-1-diene elastomer (EBDM) material in a continuous flow atmospheric pressure reaction. Although of interest, the low product yield in view of the high monomer requirements for such process renders it undesirable for commercial utilization.

Although the weather and acid resistance and high and low temperature performance properties of an EPDM elastomer make it a desirable material for a wide variety of high volume elastomer applications, a major factor affecting production costs and hence the utility of an EPDM in these applications is the diene monomer cost. The diene, whether 5-ethylidene-2-norbornene (ENB), 5-vinylidene-2-norbornene (VNB), dicyclopentadiene (DCPD) or 1,4-hexadiene (HD), is a more expensive monomer material than ethylene or propylene. Further, the reactivity of diene monomers with metallocene catalysts described in the prior art is lower than that of ethylene and propylene. Consequently, to achieve the requisite degree of diene incorporation to produce an EPDM with an acceptably fast cure rate, it has been necessary to use a diene monomer concentration which, expressed as a percentage of the total concentration of monomers present, is in substantial excess compared to the percentage of diene desired to be incorporated into the final EPDM product. In turn, the poor conversion of diene monomer increases the cost of production, since the substantial amounts of unreacted diene monomer must be recovered from the polymerization reactor effluent for recycle.

Further adding to the cost of producing an EPDM is the fact that exposure of an olefin polymerization catalyst to a diene, especially the high concentrations of diene monomer required to produce the requisite level of diene incorporation in the final EPDM product, often reduces the rate or activity at which the catalyst will cause polymerization of ethylene and propylene monomers to proceed. Correspondingly, lower throughputs and longer reaction times have been required, compared to the production of an ethylene-propylene copolymer elastomer (EP) or other $\alpha$-olefin copolymer elastomer.

To date there has been no suggestion in the art of a process utilizing a metallocene-alumoxane catalyst system which possesses the necessary combination of properties, namely, high activity in presence of diene monomer, high diene incorporation and conversion rate, high polymer molecular weight with high yield, which are requisites for the economical manufacture of a high molecular weight EPDM elastomer product. Nor has there been a suggestion in the art of a metallocene-alumoxane catalyst system which will produce high ethylene content EPDM materials having a heat of fusion value below about 3 cal/g and a desirably narrow molecular weight distribution (MWD) of Mw/Mn less than 3.0.

SUMMARY OF THE INVENTION

This invention comprises a method for producing high molecular weight EPDM elastomers by solution or slurry polymerization of ethylene, propylene or other $\alpha$-olefin, and a non-conjugated diene monomer in the presence of a metallocene-alumoxane catalyst system in which the metallocene component comprises:

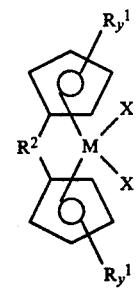

wherein "M" is titanium, zirconium or hafnium; each "$R^1$" independently is a $C_1$ to $C_{20}$ linear, branched or cyclic alkyl group or a $C_2$–$C_4$ alkylene which forms a fused ring system; "$R^2$" is a $C_1$ to $C_6$ linear, branched or cyclic alkyl group, an alkyl substituted silanylene group or an alkyl substituted silaalkylene bridging group (i.e., a bridging group containing both carbon and silicon atoms wherein the silicon atom is alkyl substituted); each "X" independently is a halogen, hydride, a hydrocarbyl radical such as an aryl group or a linear, branched or cyclic alkyl group, or chelating group, and "y" is an integer of 2, 3 or 4. Typically the X hydrocarbyl group may have from 1 to 20 carbon atoms, but may be greater if desired. Preferably "$R^1$" is butylene, to yield a tetrahydroindenyl fused ring structure, and "R²" is ethylene, dialkylsilanylene, or tetra alkyldisilanylene. Such metallocene catalyst system is preferably supported on a silica gel support, in the presence or absence of the alumoxane cocatalyst, and is employed for the production of an EPDM in a slurry polymerization procedure wherein the propylene or other α-olefin monomer suitable for use as a polymerization diluent serves as the polymerization diluent, in the presence or absence of additional alumoxane in the liquid phase beyond that which is already present on the support. By "slurry" polymerization it is meant that the product polymer is produced in the form of granules suspended in the polymerization diluent. An EPDM elastomer material produced by the process of this invention is characterized by a heat of fusion of less than 3 cal/g at ethylene contents up to 70 wt %.

DESCRIPTION OF THE PREFERRED EMBODIMENTS

This invention relates to a process for producing EPDM elastomers of high molecular weight, low crystallinity, and greater than about 3 weight percent diene content. In particular it relates to a catalyst system comprising an alkylene or silanylene or mixed alkylene-silanylene bridged bis(substituted cyclopentadienyl) Group IVB transition metal compound-alumoxane system which is highly active for the production of high molecular weight-high diene-high ethylene content EPDM elastomeric polymers having a low heat of fusion.

As used herein the term "EPDM" encompasses polymers comprised of ethylene, an alpha-olefin, and one or more non-conjugated diene monomers. The non-conjugated diene monomer can be a straight chain, branched chain or cyclic hydrocarbon diene having from about 6 to about 15 carbon atoms. Examples of suitable non-conjugated dienes are straight chain acyclic dienes such as 1,4-hexadiene and 1,6-octadiene: branched chain acyclic dienes such as 5-methyl-1,4-hexadiene; 3,7-dimethyl-1,6-octadiene; 3,7-dimethyl-1,7-octadiene and mixed isomers of dihydro myricene and dihydroocinene: single ring alicyclic dienes such as 1,3-cyclopentadiene; 1,4-cyclohexadiene; 1,5-cyclooctadiene and 1,5-cyclododecadiene: and multi-ring alicyclic fused and bridged ring dienes such as tetrahydroindene, methyl tetrahydroindene, dicyclopentadiene; bicyclo-(2,2,1)-hepta-2, 5-diene; alkenyl, alkylidene, cycloalkenyl and cycloalkylidene norbornenes such as 5-methylene-2-norbornene (MNB); 5-propenyl-2-norbornene, 5-isopropylidene-2-norbornene,5-(4-cyclopentenyl)-2-norbornene, 5-cyclohexylidene-2-norbornene, 5-vinyl-2-norbornene and norbornadiene.

Of the dienes typically used to prepare EPDMs, the particularly preferred dienes are 1,4-hexadiene (HD), 5-ethylidene-2-norbornene (ENB), 5-vinylidene-2-norbornene (VNB), 5-methylene-2-norbornene (MNB), and dicyclopentadiene (DCPD). The especially preferred dienes are 5-ethylidene-2-norbornene (ENB) and 1,4-hexadiene (HD).

The preferred EPDM elastomers may contain about 20 up to about 90 weight percent ethylene, more preferably about 30 to 85 weight percent ethylene, most preferably about 35 to about 80 weight percent ethylene.

The alpha-olefins suitable for use in the preparation of elastomers with ethylene and dienes are preferably $C_3$–$C_{16}$ alpha-olefins. Illustrative non-limiting examples of such alpha-olefins are propylene, 1-butene, 1-pentene, 1-hexene, 1-octene and 1-dodecene. The alpha-olefin is generally incorporated into the EPDM polymer at about 10 to about 80 weight percent, more preferably at about 20 to about 65 weight percent. The non-conjugated dienes are generally incorporated into the EPDM at about 0.5 to about 20 weight percent; more preferably at about 1 to about 15 weight percent, and most preferably at 3 to about 12 weight percent. If desired, more than one diene may be incorporated simultaneously, for example HD and ENB, with total diene incorporation within the limits specified above.

The catalyst employed in the method of this invention is a metalocene-alumoxane system wherein the metallocene component of the catalyst system is of the formula:

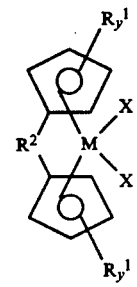

wherein "M" is titanium, zirconium or hafnium; $R^2$ bridging group is a linear, branched or cyclic alkylene radical having from one to six carbon atoms, an alkyl substituted silanylene group having from one to two silicon atoms or an alkyl substituted silaalkylene group (i.e., a bridging chain comprising silicon and carbon atoms); each $R^1$ independently is a linear or branched hydrocarbyl radical from one to twenty carbon atoms or a cyclic hydrocarbylene radical having carbon atoms joined to different ring positions of the cyclopentadienyl group to form a $C_4$–$C_6$ fused ring system; each "X" independently is hydride, halogen, or a hydrocarbly radical such as an aryl group or a linear, branched or cyclic alkyl group; and "y" is an integer from 2 to 4. The metallocene is preferably a zirconocene, that is "M" is zirconium. Exemplary $R^1$ hydrocarbyl radicals are methyl, ethyl, propyl, butyl, amyl, isoamyl, hexyl, isobutyl, heptyl, octyl, nonyl, dicyl, cetyl, 2-ethylhexyl, phenyl, and the like. Exemplary $R^1$ hydrocarbylene radicals are propylene, butylene or the like. Preferably the $R^1$ group is a cyclic hydrocarbylene of butylene which is joined to adjacent ring positions of the cyclopentadienyl ligand to provide a tetrahydroindenyl group. Hence, in the preferred case the metallocene component of the catalyst system is of the formula:

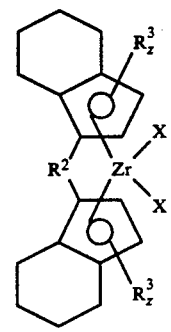

wherein each "R³" independently is a linear or branched hydrocarbyl radical having from 1 to 20 carbon atoms; "z" is an integer from 0 to 2; and "R²" and "X" are as previously described. Exemplary R² linear alkylene radicals are methylene, ethylene, propylene, butylene, pentylene, hexylene and the like. Exemplary R² cyclic alkylene radicals are cyclobutylene, cyclopentylene, cyclohexylene and the like. Exemplary R² alkyl substituted silanylene groups are dimethysilanylene, tetra methyldisilanylene, methylethylsilanylene, diethylsilanylene and the like. The R² group may also be a bridge composed of a carbon-silicon sequence, e.g., —Si(R')$_2$—C(R")$_2$—wherein R' is lower alkyl and R" is hydrogen or lower alkyl; which is here referred to an alkyl substituted silaalkylene group. Exemplary R$_2$ alkyl substituted silaalkylene groups are 1-sila-1,1-dimethylethylene, 2-sila-2,2-dimethylpropylene, 1,3-disila-1,1,3,3-tetramethylpropylene, and the like. Preferably R² is ethylene or dimethyl-silanylene, most preferably R² is dimethylsilanylene.

The preferred zirconocenes are ethyene bis(tetrahydroindenyl) and dimethylsilanylene bis(tetrahydroindenyl)-, with dimethylsilanylene bis(tetrahydroindenyl) zirconocenes the most preferred. Exemplary of suitable zirconocenes are ethylene bridged bis(tetrahydroindenyl) zirconium dichloride and dimethylsilanylene bridged bis(tetrahydroindenyl) zirconium dichloride.

Methods for preparing the required metallocene are known in the art, for example, see H. H. Brintzinger, et. al.; *Journal of Organometallic Chemistry*, Vol. 288, p. 63 (1985) and C. S. Bajgur, W. R. Tikkanen, J. L. Peterson; *Inorg. Chem.*, Vol. 24, pp. 2539-2546 (1985).

The alumoxane component of the catalyst system is an oligomeric aluminum compound represented by the general formula (R—Al—O)$_n$, which is a cyclic compound, or R(R—Al—O—)$_n$AlR$_2$, which is a linear compound. In the general alumoxane formula "R" is a $C_1$-$C_5$ alkyl radical, for example, methyl, ethyl, propyl, butyl or pentyl and "n" is an integer from 1 to about 25. Most preferably, "R" is methyl and "n" is at least 4. Alumoxanes can be prepared by various procedures known in the art. For example, an aluminum alkyl may be treated with water dissolved in an inert organic solvent, or it may be contacted with a hydrated salt, such as hydrated copper sulfate suspended in an inert organic solvent, to yield an alumoxane. Generally, however prepared, the reaction of an aluminum alkyl with a stoichiometric amount of water yields a mixture of the linear and cyclic species of the alumoxane.

The catalyst employed in the method of the invention comprises a system formed upon admixture of a metallocene, as specified, with an alumoxane. The catalyst system obtained through contacting of the metallocene and the alumoxane cocatalyst may be formed prior o introduction of these components into the reactor, e.g., on a support surface, or, alternatively, it may be formed in the reactor. In the case that the active system is formed in the polymerization reactor, the molar ratio of Al to Group IVB transition metal in the reactor is desirably in the range 10-5000, preferably 20-4000 and most preferably 20-1000. In the case that the active system is formed outside the reactor, the preferred molar ratio of Al to Group IVB transition metal is in the range 1-1000, desirably 20-200. In the latter case, additional alumoxane cocatalyst may be used in the reactor so that the total ratio of Al to Group IVB transition metal is in the range 10-5000 preferably 20-4000 and most preferably 20-1000. Likewise, in this case, a small amount of another aluminum compound may be added to the reactor together with, or instead of, additional alumoxane, for the purposes of scavenging any impurities which may be present in the reactor.

The catalyst system may be prepared as a homogeneous catalyst by addition of the requisite metallocene and alumoxane to a solvent in which polymerization will be carried out by solution polymerization procedures. However, in the context of the present invention, the catalyst system is preferably prepared and employed as a heterogeneous catalyst by adsorbing the requisite metallocene, preferably zirconocene, and alumoxane components on a catalyst support material such as silica gel, alumina or other suitable inorganic support material. When prepared in heterogeneous or supported form, it is preferred to use silica gel as the support material. The heterogeneous form of the catalyst system is employed in a slurry polymerization procedure with or without additional alumoxane present in the liquid phase. As a practical limitation, slurry polymerization takes place in liquid diluents in which the polymer product is substantially insoluble. Preferably, the diluent for slurry polymerization is one or more hydrocarbons with less than 5 carbon atoms. If desired, saturated hydrocarbons such as ethane, propane or butane may be used in whole or part as the diluent. Likewise the α-olefin monomer or a mixture of different α-olefin monomers may be used in whole or part as the diluent. Most preferably the diluent comprises in at least major part the α-olefin monomer or monomers to be polymerized. In the production of EPDM elastomers in accordance with the method of this invention, it is preferred to utilize the α-olefin monomer in excess in liquified state as the polymerization diluent.

The support material for preparing a heterogeneous catalyst may be any finely divided inorganic solid porous support, such as talc, silica, alumina, silica-alumina and mixtures thereof. Other inorganic oxides that may be employed either alone or in combination with silica or silica-alumina are magnesia, titania, zirconia, and the like. The preferred support material is a silica gel.

The metallocene and alumoxane are utilized in the form of a heterogeneous supported catalyst by deposition on the support material. While it should not be construed that the invention is limited in any way by the following mechanistic interpretation, it is considered that for optimal effectiveness of the alumoxane deposited on the support, it is desirable that the unbound water initially present on the support should be essentially wholly removed. For example, silica gel may be dehydrated by heating or otherwise treating it to remove its water content or its water content may be converted to a derivate which is clement to the formation the metallocene-alumoxane catalyst system. A suitable silica gel would have a particle diameter in the range 1-600 microns, preferably 10-100 microns; a surface area of 50-1000 m²/g, preferably 100-500 m²/g; and a pore volume of 0.5-3.5 cm³/g. The silica gel may be heat treated at 100°-1000° C., preferably 300°-800° C. for a period of 1-100 hours, preferably 3-24 hours.

The order of addition of the metallocene and alumoxane to the support material can vary. For example, the metallocene (dissolved in a suitable hydrocarbon solvent) can be first added to the support material followed by the addition of the alumoxane; the alumoxane and metallocene can be added to the support material simultaneously; or the alumoxane can be first added to the support material followed by the addition of the metallocene.

As stated before, zirconocenes of the specified class are the preferred metallocenes. Consequently further discussion of the catalyst will be with specific reference to zirconocenes although it should be understood that similar conditions and procedures are applicable to titanocenes and hafnocenes as well.

In the preferred case, a dehydrated silica gel is contacted with alumoxane and subsequently with the zirconocene. If desired, the zirconocene can be added to a dehydroxylated silica gel prior to contacting the silica gel with an alumoxane. In accordance with the preferred embodiment of this invention, the alumoxane dissolved in a suitable inert hydrocarbon solvent is added to the support material either dry or slurried in the same or other suitable hydrocarbon liquid and thereafter the zirconocene is added to the slurry, preferably after drying the support under vacuum and reslurrying in a light hydrocarbon. The zirconocene is added to the slurry in an amount sufficient to provide from about 0.02 to about 5.0 weight percent zirconium metal based on total catalyst weight. The zirconocene is more preferably added in an amount to provide from about 0.10 to about 1.0 weight percent zirconium metal based on total catalyst weight.

The treatment of the support material, as mentioned above, is conducted in an inert solvent. The same inert solvent or a different inert solvent can be employed to dissolve the zirconocene and alumoxanes. Preferred solvents include mineral oils and the various hydrocarbons which are liquid at reaction temperatures and in which the individual adsorbates are soluble. Illustrative examples of useful solvents include alkanes such as pentane, iso-pentane, hexane, heptane, octane and nonane; cycloalkanes such as cyclopentane and cyclohexane; and aromatics such as benzene, toluene, xylenes, ethylbenzene and diethylbenzene. The support material may be present by itself, which is preferred, or may be slurried in the inert solvent in which the zirconocene and alumoxane are dissolved prior to the addition of the support material.

The supported catalyst is prepared by adding the adsorbates in a suitable solvent, e.g., toluene, to the support material which is by itself or in a slurry. Preferably, a solution of the adsorbate is added to the dried support material. Most preferably, a toluene solution of the adsorbate is added to silica. In accordance with the preferred embodiment of this invention, the alumoxane dissolved in toluene is added to the silica particles in a first step, and the treated solid is dried. The dried solid is then treated with a solution of inert solvent dissolved zirconocene as a second step. In both of these steps, the conditions for addition of the adsorbates are not particularly critical. The amount of solvent to be employed should be sufficient to provide adequate heat transfer away from the catalyst components during reaction and to permit good mixing. The temperature maintained during the contact of the reactants can vary widely, such as, for example, from 0° to 100° C. Greater or lesser temperatures can also be employed. Although the reaction between the alumoxane and the support material is rapid, it is desirable that the alumoxane be contacted with the support material for about one half hour up to eighteen hours or greater. Preferably, the reaction is maintained for about one hour.

At all times, the individual ingredients as well as the recovered catalyst components must be protected from oxygen and moisture. Therefore, the reactions must be performed in an oxygen and moisture free atmosphere and recovered in an oxygen and moisture free atmosphere. Preferably, therefore, the reactions are performed in the presence of an dry, inert gas such as, for example, nitrogen. The recovered solid catalyst is maintained in a nitrogen atmosphere.

Upon completion of the deposition of the zirconocene and alumoxane on the support, the solid material can optionally be treated with a small amount of monomer, e.g. ethylene, to form an amount of polymer on the solid catalyst materials to increase the catalyst weight from about 50 to about 1000% based on initial weight of catalyst and support material. Such treatment is hereafter referred to as a prepolymerization of the catalyst. Prepolymerization of the solid catalyst material aids in obtaining an EPDM elastomer produced therefrom during slurry polymerization in well defined particle form. The solid material, as such or as prepolymerized, can be recovered by any well-known technique. For example, the solid catalyst material can be recovered from the liquid solvent by vacuum evaporation or decantation. The solid is thereafter dried under a stream of pure dry nitrogen or dried under vacuum.

In accordance with the preferred procedure of this invention an EPDM elastomer is produced by slurry polymerization utilizing $\alpha$-olefin monomer, preferably propylene, as the polymerization diluent in which a supported zirconocene-alumoxane catalyst system is suspended, in an amount sufficient to yield a polymer with the desired diene content, generally greater than or equal to 3 wt %. The concentration of diene in the reactor as a volume percentage of total diluent present will range from 0.1 to 25 vol %, with 0.5 to 10 vol % preferred and 1 to 5 vol % especially preferred. Diene monomer is supplied to the polymerization diluent. Ethylene is added to the reaction vessel in an amount to maintain a differential pressure in excess of the combined vapor pressure of the $\alpha$-olefin and diene monomers. The ethylene content of the polymer is determined by the ratio of ethylene differential pressure to the total reactor pressure. Generally the polymerization process is carried out with a differential pressure of ethylene of from about 10 to about 1000 psi, most preferably from about 40 to about 400 psi; and the polymerization diluent is maintained at a temperature of from about $-10°$ to about 90° C.; preferably from about 10° to about 70° C., and most preferably from about 20° to about 60° C. Under the conditions as indicated above the ethylene, -olefin and diene polymerize to an EPDM elastomer.

The polymerization may be carried out as a batchwise slurry polymerization or as a continuous process slurry polymerization. The procedure of continuous process slurry polymerization is preferred, in which event ethylene, $\alpha$-olefin, diene, and catalyst are continuously supplied to the reaction zone.

Without limiting in any way the scope of the invention, one means for carrying out the process of the present invention is as follows: In a stirred-tank reactor liquid propylene monomer is introduced continuously together with diene monomer and ethylene monomer. The reactor contains a liquid phase composed substantially of liquid propylene and diene monomers together with dissolved ethylene gas, and a vapor phase containing vapors of all monomers. Feed ethylene gas is introduced either into the vapor phase of the reactor, or sparged into the liquid phase as well known in the art.

Catalyst and any additional cocatalyst and scavenger, if employed, are introduced via nozzles in either the vapor or liquid phase, with polymerization occurring substantially in the liquid phase. The reactor temperature and pressure may be controlled via reflux of vaporizing alpha-olefin monomers (autorefrigeration, as well as by cooling coils, jackets etc. The polymerization rate is controlled by the rate of catalyst addition. The ethylene content of the polymer product is determined by the ratio of ethylene to propylene in the reactor, which is controlled by manipulating the respective feed rates of these components to the reactor. The polymer product molecular weight is controlled, optionally, by controlling other polymerization variables such as the temperature, or by a stream of hydrogen introduced to the gas or liquid phase of the reactor, as is well known in the art. The polymer product which leaves the reactor is recovered by flashing off gaseous ethylene and propylene at reduced pressure, and, if necessary, conducting further devolatilization to remove residual olefin and diene monomers in equipment such as a devolatilizing extruder. In a continuous process the mean residence time of the catalyst and polymer in the reactor generally is from about 20 minutes to 8 hours, and preferably 30 minutes to 6 hours, and more preferably 1 to 4 hours.

The final properties of the EPDM elastomer produced by the process of the invention are related to the reaction conditions particularly the ethylene-α-olefin ratio, the concentration of diene monomer, the catalyst residence time and concentration of hydrogen, if present.

Longer catalyst residence time will result in a higher yield of an EPDM elastomer when other conditions are constant, providing a product with low residues of aluminum, Group IVB transition metal and support material. Higher diene monomer concentrations will provide an EPDM having a high weight percentage of incorporated diene. For a given catalyst system, the degree of crystallinity expressed as the heat of fusion measured by DSC depends primarily on the ethylene content in the polymer, which in turn is determined by the polymerization reaction conditions. At a given ethylene content, the heat of fusion, for an EPDM elastomer produced in accordance with the bridged metallocene catalyst process of the invention is significantly lower than for an EPDM produced by process employing an unbridged metallocene catalyst. As mentioned previously, the molecular weight of the polymer product can be controlled by methods well known in the art, such as by addition of hydrogen to the polymerization system. However, with the catalytic process of this invention, the weight average molecular weight of the EPDM polymers produced according to the present invention is greater than or equal to 110,000. Alternatively, in terms of the Mooney viscosity, the polymer $ML_{1+8}$ at 127° C. is greater than or equal to 10. The heat of fusion of EPDM polymers produced according to the present invention is less than 0.05 cal/g when the ethylene content of the polymer is less than 55 wt %. When the ethylene content E is greater than or equal to 55 wt %, the heat of fusion is less than 0.4 (E - 55) cal/g, preferably less than 0.2 (E - 55) cal/g and more preferably less than 0.15 (E - 55) cal/g.

In the Examples which illustrate the practice of the invention, the analytical techniques described below were employed for the analysis of the resulting EPDM elastomer products.

The heat of fusion (heading "HOF cal/g" in Table IB) was determined by DSC according to the following technique. Approximately 0.5 g of polymer was placed between two sheets of Mylar ® film and pressed in a 20 mil mold at 150° C. for 30 minutes. The resulting pad was annealed for at least 1 day at room temperature. The DSC analysis was run under a helium atmosphere on a Perkin-Elmer DSC-7, using 10-15 mg from the pad. The cycle consisted of loading at room temperature, cooling to ~ −125° C., followed by heating to −200° C. at a rate of 20° C. per minute. The heat of fusion was obtained by summing the area of well-defined peaks occurring above the glass transition temperature, at which a baseline change occured. In general, a well-defined melting peak is observed at around 40° C., and occasionally an additional peak is observed at 100°-110° C. For some samples crystallinity was also measured by an X-ray diffraction method and is denoted in Table IB as "XRC %."

The ethylene and diene contents of EPDM elastomer products (heading "$^1$H NMR $C_2$ wt %" and "$^1$H NMR Diene wt %" in Table IB) were determined by $^1$H nuclear magnetic resonance (NMR), according to the following technique. $^1$H NMR spectra at 400 MHz were recorded on a Varian XL-400 NMR spectrometer operating in Fourier Transform mode, with the following instrument conditions: pulse angle, 40°; acquisition time, 0.7 sec; pulse delay, 5.0 sec; spectral width, 12,000 Hz, and number of transient accumulated, 200. Samples were dissolved in deuterated chloroform at room temperature, at a concentration of 1-2 wt %. For the determination of ethylene content, the integrals of the methyl region, $I_1$, (chemical shift delta versus tetramethysilane $=0.88$ ppm to 0.94 ppm) and the methylene and methine region, $I_2$ (delta$=1.10$ ppm to 1.54 ppm) were employed. The ethylene mole percentage is then determined from the formula $E(\text{mole \%})=3(I_2-I_1)/(3I_2+I_1)\times 100$. When the diene is 1,4-hexadiene, the diene content was determined from the integral of the peak for olefinic protons occurring at 5.48 ppm, and the methylene, methyl and methine regions were corrected for the presence of hexadiene incorporated in the polymer. In addition, unincorporated hexadiene, if present, was distinguished by the presence of vinyl protons appearing at ~5.7-5.8 ppm. When the diene is ENB, the diene content was determined from the integral of the peak for olefinic protons occurring at 5.28 and 5.02 ppm (for cis- and transmethine protons of $=CH-CH_3$, respectively) and the methylene, methyl and methine regions were corrected for the presence of incorporated ENB. In addition, unincorporated ENB, if present, was distinguished by the presence of vinyl protons appearing at 6.01 ppm. In this way, the proton NMR analysis was capable of yielding unambiguous values for the contents of ethylene, propylene and diene incorporated in the polymer.

Molecular weight determinations for EPDM elastomer products (heading "$Mn \times 10^3$" and "$Mw \times 10^3$" in Table IB) were made by gel permeation chromatography (GPC) according to the following technique. Molecular weights and molecular weight distributions were measured using a Waters 150 gel permeation chromatograph equipped with a Chromatix KMX-6 on-line light scattering photometer. The system was used at 135° C. with 1,2,4-tricholorobenzene as the mobile phase. Shodex (Showa Denko America, Inc.) polystyrene gel columns 802, 803, 804 and 805 were used. This technique is discussed in "Liquid Chromatography of Polymers and Related Materials III", J. Cazes editor, Marcel Dekker, 1981, p. 207 which is incorporated herein by reference. No corrections for column spreading were employed; however, data on generally accepted standards, e.g., National Bureau of Standards Polyethylene 1484 and anionically produced hydrogenated polyisoprenes, which are alternating ethylene-propylene copolymers, demonstrated that such corrections on Mw/Mn were less than 0.05 units. The molecular weight distribution (MWD), expressed by Mw/Mn, was calculated from an elution time. The numerical analyses were performed using the commercially available Beckman/CIS customized LALLS software in conjunction with the standard Gel Permeation package, run on a Hewlett-Packard 1000 computer.

The Mooney viscosity, $ML_{1+8}$ at 127° C., was measured in a Monsanto Mooney Viscometer according to ASTM standard D1646.

Catalyst Preparation Examples

Example 1 Synthesis of methylalumoxane/silica gel support [MAO/SiO$_2$]

In a dry box, 30 ml of a solution of methylalumoxane in toluene which contained 1.8 g of MAO (nominal 1M concentration obtained from Ethyl Corp.) was added to 15 g of Davison 944 silica gel which had been dried at 800° C. The solvent was removed under vacuum. The nominal loading of MAO on silica was 11 wt %.

Example 2 Silica supported bis (tetrahydroindenyl) zirconium dichloride catalyst A MAO-treated silica gel was prepared in the same manner as in Example 1, except that 25 ml of 1 M MAO was added instead of 30 ml. The nominal loading of MAO on silica was 9 wt %. 5 g of the resulting MAO-treated silica gel was weighed into a 50 ml Schlenk flask in a dry box. 250 mg of bis(tetrahydroindenyl) zirconium dichloride was dissolved in 7 ml of toluene, and the toluene solution was added dropwise to the MAO-treated silica gel support with stirring over 30 minutes. The solid caked. After 5 minutes of homogenization using a stir bar, 6 ml of additional dry toluene was added to slurry the silica. The flask was removed to a vacuum line and toluene was removed under vacuum. The dried solid nominally contains 4.8% by weight of the zirconocene, and 1.08 wt % Zr.

Example 3 Silica-supported ethylene bridged bis(tetrahydroindenyl) zirconium dichloride catalyst In a dry box, 2.0 g of the MAO-treated silica gel support made in Example 1 was weighed into a 50 ml Schlenk flask equipped with a 1 inch magnetic stir-bar. 50 mg of ethylene-bis(tetrahydroindenyl) zirconium dichloride was dissolved in 3 ml of toluene with the aid of a heat gun. After dissolution, the solution was added dropwise to the 2 g of MAO-treated silica and then 4 ml of additional dry toluene was added to convert the powder into a slurry. This was removed from the dry box and stirred at 55° C. in an oil bath for 30 minutes. The slurry was then evacuated. When completely dry, 1.834 g of solids were recovered. The nominal loading was 2.5 wt % zirconocene or 0.52 wt % Zr.

Example 4 Silica-supported dimethylsilanylenebis(tetrahydroindenyl) zirconium dichloride catalyst In a dry box, a solution of 50 mg of dimethylsilanylene bis(tetrahydroindenyl) zirconium dichloride in 3 ml of toluene was added dropwise to 2.0 g of the MAO-treated silica of Example 1 which was vigorously stirred with a magnetic stir bar. Another 4 ml of toluene was then added to slurry the solids. The slurry was stirred at 55° C. for 30 minutes and then the solvent was removed under vacuum. Nominally, the catalyst contained 2.5 wt % zirconocene or 0.49 wt. % Zr.

Polymerization Examples

Comparative Example 5: Ethylene-Propylene copolymerization with dimethylsilanylene bis(tetrahydroindenyl) zirconium dichloride catalyst 10 mg of the silica-supported dimethylsilanylene-bridged bis(tetrahydroindenyl) zirconium dichloride catalyst of Example 4 was charged to a 1 liter reactor containing 500 ml of liquid propylene pressurized to a total pressure of 525 psig with ethylene at 50° C. 1 ml of 1 molar methylalumoxane and 1 ml of 25% triethylaluminum were employed as cocatalyst. Polymerization was carried out for 30 minutes. Product was recovered by venting off the propylene and drying the polymer (in the presence of antioxidant) in a vacuum oven. 19 g of dry product was recovered for a catalyst efficiency of 776 kg polymer/g-Zr.hr. The ethylene content determined by :H NMR was 60.5 wt % and the number-and weight-average molecular weights from GPC were 110000 and 255000, respectively, such that Mw/Mn was 2.3.

Comparative Example 6: Hexadiene terpolymerization with bis(tetrahydroindenyl) zirconium dichloride supported catalyst 30 mg of the silica-supported bis(tetrahydroindenyl) zirconium dichloride catalyst of Example 2 was charged to a 2 liter reactor containing 1000 ml of liquid propylene and 50 ml of 1,4-hexadiene pressurized to a total pressure of 360 psig with ethylene (ethylene differential pressure approximately 100 psi) at 50° C. Additionally, 6 ml of 1 molar methylalumoxane was contained in the liquid phase as cocatalyst. Polymerization was carried out for one hour. Product polymer was recovered by venting off the propylene and drying the polymer (in the presence of antioxidant) in a vacuum oven. 156.2 g of dry polymer product was recovered for a catalyst efficiency of 482 kg polymer /g-Zr.hr. Ethylene content measured by $^1$H NMR was determined as 78.4 wt % and hexadiene content was 1.2 wt %. The polymer had a Mooney viscosity ($ML_{1+8}$ at 127° C.) of 38, and the number-and weight-average molecular weight determined by GPC were 69000 and 182000, respectively, such that Mw/Mn was 2.6. The heat of fusion of this polymer product was 9.8 cal/g.

Comparative Examples 7–10: hexadiene terpolymerization with bis(tetrahydroindenyl)zirconium dichloride supported catalyst Further polymerization runs were conducted in accordance with the procedure described in Example 6 using supported catalyst materials prepared in the manner as described by Example 2. The conditions under which the additional polymerization runs, Examples 7-10 were conducted are reported in Table IA. The properties measured on the EPDM polymer products produced by such polymerization runs are reported in Table IB.

Comparative Example 11: ENB terpolymerization with bis(tetrahydroindenyl) zirconium dichloride supported catalyst 30 mg of the silica-supported bis(tetrahydroindenyl) zirconium dichloride catalyst, of Example 2 and with a zirconium content of 1.08 wt %, was charged to a 2 liter reactor containing 1000 ml of liquid propylene and 10 ml of ethylidene norbornene pressurized to a total pressure of approximately 380 psig with ethylene at 50° C. 6 ml of 1 molar methylalumoxane was employed as cocatalyst. Polymerization was carried out for one hour. Product was recovered by venting off the propylene and drying the polymer (in the presence of antioxidant) in a vacuum oven. 19 g of dry product was recovered for a catalyst efficiency of 58.6 kg polymer/g-Zr.hr. Proton NMR showed that the polymer contained 68.2 wt % ethylene and 4.5 wt % ENB. The product had number-average and weight-average molecular weights of 31,000 and 72,000, respectively, such that Mw/Mn was 2.3. The heat of fusion was 5.2 cal/g.

Comparative Example 12: ENB Terpolymerization with bis(tetrahydroindenyl) zirconium dichloride supported catalyst An additional polymerization run was conducted in accordance with the procedure described in Example 11 using a supported catalyst prepared in the manner as described by Example 2. The conditions under which the additional polymerization run, Example 12, was conducted and the properties measured on the EPDM polymer so produced are reported in Tables IA and IB.

Example 13: 1,4-Hexadiene terpolymerization with ethylene-bridged bis(tetrahydroindenyl) zirconium dichloride supported catalyst 100 mg of the silica-supported ethylene-bridged bis(tetrahydroindenyl) zirconium dichloride supported catalyst of Example 3 was charged to a 2 liter reactor containing 1000 ml of liquid propylene and 100 ml of 1,4-hexadiene pressured to a total pressure of 400 psig with ethylene (ethylene differential pressure approximately 150 psi) at 50° C. 4 ml of 1 molar methylalumoxane was present in the reactor as cocatalyst. Polymerization was carried out for two hours. Product was recovered by venting off the propylene and drying the polymer (in the presence of antioxidant) in a vacuum oven. 519.3 g of dry product was recovered for a catalyst efficiency of 400 kg/g-Zr.hr. Proton NMR showed that the polymer was 61.3 wt % ethylene and contained 5.3 wt % hexadiene The Mooney viscosity (ML$_{1+8}$ at 127° C.) was 140 and the number- and weight-average molecular weights determined by GPC were 108,000 and 375,000, respectively, such that Mw/Mn was 3.5. The polymer had a heat of fusion of 0.4 cal/g and a glass transition temperature of −50.5° C.

Examples 14–15: 1,4-Hexadiene terpolymerization with ethylene-bridged bis(tetrahydroindenyl) zirconium dichloride supported catalyst Further polymerization runs were conducted in accordance with the procedure described in Example 13 using a supported catalyst material prepared in the manner as described by Example 3. The conditions under which the additional polymerization runs, Examples 14–15, were conducted and the properties measured on the EPDM polymer so produced are reported in Tables IA and IB.

Example 16: 1,4-Hexadiene tempolymerization with dimethylsilanylene-bridged bis(tetrahydroindenyl) zirconium dichloride silica-supported catalyst 50 mg of the silica-supported dimethylsilanylene-bridged bis(tetrahydroindenyl) zirconium dichloride catalyst, of Example 4 was charged to a 2 liter reactor containing 1000 ml of liquid propylene and 100 ml of 1,4-hexadiene pressurized to a total pressure of 515 psig with ethylene (ethylene differential pressure approximately 275 psi) at 50° C. 14 mmol of hydrogen was also added to the reactor prior to the polymerization. 10 ml of 1 molar methylalumoxane was employed as cocatalyst. Polymerization was carried out for one hour. Product was recovered by venting off the propylene and drying the polymer (in the presence of antioxidant) in a vacuum oven. 130 g of dry product was recovered for a catalyst efficiency of 531 kg polymer/g Zr.hr.

Examples 17–26: 1,4-Hexadiene terpolymerization with dimethysilanylene-bridged bis(tetrahydroindenyl) zirconium dichloride silica-supported catalyst Further polymerization runs were conducted in accordance with the procedure described in Example 16 using a supported catalyst material prepared in the manner as described in Example 4. The conditions under which the additional polymerization runs, Examples 17–26, were conducted are reported in Table IA. Examples 17–19 did not add any hydrogen to the reactor for molecular weight control. Examples 20–26 added varying amounts of hydrogen to the reactor for molecular weight control. The properties measured on the EPDM polymers produced in Examples 17–26 are reported in Table 1B.

Example 27: ENB terpolymerization with dimethylsilanylene-bridged bis(tetrahydroindenyl) zirconium dichloride silica-supported catalyst 50 mg of the silica-supported dimethylsilanylene-bridged bis(tetrahydroindenyl) zirconium dichloride catalyst of Example 4 was charged to a 2 liter reactor containing 1000 ml of liquid propylene and 10 ml of ethylidene norbornene pressurized to a total pressure of 540 psig with ethylene (ethylene differential pressure approximately 275 psi) at 50° C. 10 ml of 1 molar methylalumoxane was employed as cocatalyst. Polymerization was carried out for 30 minutes. Product was recovered by venting off the propylene and drying the polymer (in the presence of antioxidant) in a vacuum oven. 103 g of dry product was recovered for a catalyst efficiency of 841 kg polymer/g-Zr.hr. Proton NMR showed that the polymer was 64.3 wt % ethylene and contained 4.2 wt % ENB. The Mooney viscosity was 122, and the number-and weight-average molecular weights were 154,000 and 366,000, respectively, such that Mw/Mn was 2.4. The heat of fusion was 1.5 cal/g and the polymer exhibited a glass transition temperature of −56.9° C.

Example 28: ENB terpolymerization with dimethylsilanylene-bridged bisitetrahydroindenyl) zirconium dichloride silica-supported catalyst 50 mg of the silica-supported dimethylsilanylene-bridged bis(tetrahydroindenyl) zirconium dichloride supported catalyst of Example 4 was charged to a 2 liter reactor containing 1000 ml of liquid propylene and 25 ml of ethylidene norbornene pressurized to a total pressure of 540 psig with ethylene (ethylene differential pressure of approximately 275 psi) at 50° C. 10 ml of 1 molar methylalumoxane was employed as cocatalyst. Polymerization was carried out for one hour. Product was recovered by venting off the propylene and drying the polymer (in the presence of antioxidant) in a vacuum oven. 165 g of dry product was recovered for a catalyst efficiency of 673 kg polymer/g-Zr.hr. Proton NMR showed that the polymer was 58.7 wt % ethylene and contained 8.9 wt % ENB. The polymer had a Mooney viscosity of 104, a heat of fusion of 0 3 cal/g, and a glass transition temperature of −49.6° C. The number- and weight-average molecular weights were 111,000 and 291,000, respectively, such that Mw/Mn was 2.6.

Examples 29–30: ENB termpolymerization with dimethysilanylene-bridged bis(tetrahydroindenyl) zirconium dichloride silica-supported catalyst Two further polymerization runs were conducted in accordance with the procedures described in Examples 27–28 using a supported catalyst material prepared in the manner as described in Example 4. The conditions under which the polymerization runs, Examples 29–30, were conducted and the properties measured on the EPDM polymers so produced are reported in Tables IA and IB.

Comparison of the EPDM elastomers produced by the process of the invention, Examples 13 to 30, with the EPDM elastomers produced in Examples 6 to 12, show that EPDM elastomers produced in accordance with the invention have high weight-average molecular weights, i.e. weight-average molecular weight greater than 110,000, and/or Mooney viscosity ($ML_{1+8}$ at 127° C.) greater than or equal to 10, while having low crystallinity, measured as the heat of fusion, compared to EPDM elastomers produced by Examples 6 to 12. All EPDM elastomers produced by the process using a dimethysilanylene bridged bis(tetrahydroindenyl) zirconium dichloride based catalyst have a molecular weight distribution (Mw/Mn) less than 3.0.

TABLE IA

| Exp. No | Diene | Diene Added ml | T (°C.) | C2 psi* | H2 Added (mmol) | Run Time min | Cat (mg) | Cocat Added ml | Al/Zr** ×10⁻³ | Cat Eff. kg/g-Zr/hr | Yield g | Diene Conv % |
|---|---|---|---|---|---|---|---|---|---|---|---|---|
| 5 | None | 0.0 | 50 |  | 0.0 | 30 | 10 | 2.00ᵃ |  | 776 | 19.0 | — |
| 6 | 1,4-HD | 50.0 | 50 | 100 | 0.0 | 60 | 30 | 6.00 | 1.69 | 482 | 156.2 | 6.6 |
| 7 | 1,4-HD | 50.0 | 50 | 100 | 0.0 | 32 | 20 | 10.00 | 4.24 | 510 | 58.7 | N/A |
| 8 | 1,4-HD | 50.0 | 50 | 100 | 0.0 | 60 | 30 | 3.00 | 0.85 | 366 | 118.7 | 4.7 |
| 9 | 1,4-HD | 50.0 | 50 | 150 | 0.0 | 60 | 30 | 6.00 | 1.69 | 181 | 58.5 |  |
| 10 | 1,4-HD | 75.0 | 50 | 100 | 0.0 | 120 | 25 | 5.00 | 1.69 | 363 | 196.0 | 6.6 |
| 11 | ENB | 10.0 | 50 | 100 | 0.0 | 60 | 30 | 6.00 | 1.69 | 58.0 | 19.0 | 9.6 |
| 12 | ENB | 50.0 | 50 | 100 | 0.0 | 240 | 40 | 4.00 | 0.85 | 48.3 | 83.5 | 33.0 |
| 13 | 1,4-HD | 100.0 | 50 | 150 | 0.0 | 120 | 100 | 4.00 | 0.70 | 499 | 519.3 | 39.0 |
| 14 | 1,4-HD | 50.0 | 50 | 160 | 0.0 | 60 | 30 | 3.00 | 1.77 | 532 | 83.0 | 6.3 |
| 15 | 1,4-HD | 50.0 | 50 | 150 | 1.6 | 95 | 30 | 3.00 | 1.75 | 863 | 213.1 | 15.0 |
| 16 | 1,4-HD | 100.0 | 50 | 275 | 14.0 | 60 | 50 | 10.00 | 3.77 | 531 | 130.0 | 8.6 |
| 17 | 1,4-HD | 100.0 | 45 | 250 | 0.0 | 60 | 50 | 10.00 | 3.77 | 255 | 62.5 | 4.0 |
| 18 | 1,4-HD | 50.0 | 50 | 250 | 0.0 | 60 | 40 | 8.00 | 3.77 | 480 | 94.0 | 7.9 |
| 19 | 1,4-HD | 50.0 | 55 | 200 | 0.0 | 60 | 50 | 10.00 | 3.77 | 550 | 134.7 | 12.5 |
| 20 | 1,4-HD | 115.0 | 50 | 275 | 7.0 | 33 | 50 | 10.00 | 3.77 | 854 | 61.2 | 2.4 |
| 21 | 1,4-HD | 50.0 | 50 | 275 | 7.0 | 60 | 50 | 10.00 | 3.77 | 552 | 135.3 | 7.2 |
| 22 | 1,4-HD | 50.0 | 50 | 275 | 2.2 | 60 | 50 | 10.00 | 3.77 | 445 | 109.0 | 7.1 |
| 23 | 1,4-HD | 50.0 | 50 | 275 | 1.1 | 60 | 50 | 10.00 | 3.77 | 706 | 173.0 | 10.2 |
| 24 | 1,4-HD | 50.0 | 40 | 325 | 14.0 | 60 | 50 | 10.00 | 3.77 | 392 | 96.0 | 4.6 |
| 25 | 1,4-HD | 100.0 | 45 | 275 | 14.0 | 60 | 50 | 10.00 | 3.77 | 586 | 143.7 | 8.9 |
| 26 | 1,4-HD | 50.0 | 50 | 200 | 14.0 | 60 | 50 | 10.00 | 3.77 | 647 | 158.5 | 9.8 |
| 27 | ENB | 10.0 | 45 | 275 | 0.0 | 30 | 50 | 10.00 | 3.77 | 841 | 103.0 | 48.4 |
| 29 | ENB | 10.0 | 50 | 275 | 0.0 | 15 | 50 | 10.00 | 3.77 | 1224 | 75.0 | 35.2 |
| 28 | ENB | 25.0 | 50 | 275 | 0.0 | 60 | 50 | 10.00 | 3.77 | 673 | 165.0 | 65.7 |
| 30 | ENB | 50.0 | 50 | 170 | 0.0 | 120 | 30 | 6.00 | 3.77 | 221 | 65.0 | 31.0 |

*Differential pressure of ethylene over initial vapor pressure of alpha-olefin and diene at reaction temperature.
**Does not include alumoxane present on support.
ᵃCocatalyst was 1 ml of 25% triethylaluminum and 1 ml of 1 molar methylalumoxane.

TABLE IB

| Exp. No | Diene | Polymer Composition | | HOF cal/g | XRC % | $ML_{1+8}$ 127° C. | Mn ×10³ | Mw ×10³ | Mw/Mn |
|---|---|---|---|---|---|---|---|---|---|
| | | ¹H NMR C2 wt % | ¹H NMR Diene wt % | | | | | | |
| 5 | None | 60.50 | — | — | — | — | 110 | 255 | 2.3 |
| 6 | 1,4-HD | 78.40 | 1.20 | 9.8 | 9.8 | 38 | 69 | 182 | 2.6 |
| 7 | 1,4-HD | 70.10 | 1.70 | 7.0 | N/A | 48 | 62 | 162 | 2.6 |
| 8 | 1,4-HD | 75.90 | 1.40 | 9.4 | 10.7 | 32 | 61 | 183 | 3.0 |
| 9 | 1,4-HD | 81.30 | 1.20 | 15.9 | N/A | 88 | 69 | 233 | 3.4 |
| 10 | 1,4-HD | 78.00 | 1.80 | 7.3 | 6.8 | 51 | 67 | 182 | 2.7 |
| 11 | ENB | 68.20 | 4.50 | 5.2 | N/A | N/A | 31 | 72 | 2.3 |
| 12 | ENB | 50.30 | N/A | 1.1 | N/A | 4 | 30 | 81 | 2.7 |
| 13 | 1,4-HD | 61.30 | 5.30 | 0.4 | 0.0 | 140 | 108 | 375 | 3.5 |
| 14 | 1,4-HD | 68.80 | 2.70 | 1.9 | N/A | 146 | 178 | 508 | 2.9 |
| 15 | 1,4-HD | 64.80 | 2.50 | 0.9 | N/A | 136 | 81 | 262 | 3.2 |
| 16 | 1,4-HD | 69.70 | 4.70 | 1.9 | N/A | 18 | 57 | 130 | 2.3 |
| 17 | 1,4-HD | 70.20 | 3.60 | 0.7 | 2.4 | 95 | N/A | N/A | N/A |
| 18 | 1,4-HD | 64.9 | 2.80 | 0.7 | 2.0 | 110 | 147 | 367 | 2.5 |
| 19 | 1,4-HD | 62.7 | 2.50 | 0.4 | N/A | 128 | 147 | 358 | 2.4 |
| 20 | 1,4-HD | 73.30 | 3.20 | 2.4 | N/A | 88 | N/A | N/A | N/A |

TABLE IB-continued

| Exp. No | Diene | Polymer Composition ¹H NMR C2 wt % | ¹H NMR Diene wt % | HOF cal/g | XRC % | ML₁₊₈ 127° C. | Mn ×10³ | Mw ×10³ | Mw/Mn |
|---|---|---|---|---|---|---|---|---|---|
| 21 | 1,4-HD | 67.1 | 2.40 | 0.9 | 5.6 | 94 | 92 | 230 | 2.5 |
| 22 | 1,4-HD | 67.4 | 2.20 | N/A | N/A | 130 | N/A | N/A | N/A |
| 23 | 1,4-HD | 67.7 | 2.10 | N/A | N/A | 124 | N/A | N/A | N/A |
| 24 | 1,4-HD | 70.9 | 1.80 | N/A | N/A | 11 | 41 | 118 | 2.9 |
| 25 | 1,4-HD | 66.90 | 4.40 | 1.6 | N/A | 40 | 74 | 174 | 2.4 |
| 26 | 1,4-HD | 65.9 | 2.30 | N/A | N/A | 52 | N/A | N/A | N/A |
| 27 | ENB | 64.30 | 4.20 | 1.5 | N/A | 122 | 154 | 366 | 2.4 |
| 28 | ENB | 58.70 | 8.90 | 0.3 | N/A | 104 | 111 | 291 | 2.6 |
| 29 | ENB | 58.50 | 4.20 | N/A | N/A | 124 | 129 | 345 | 2.7 |
| 30 | ENB | 36.50 | N/A | N/A | N/A | 18 | 61 | 154 | 2.5 |

EPDM elastomers produced in accordance with the invention have exceptionally low crystallinities relative to their weight percent content of ethylene, compared to EPDM elastomers produced in Comparative Examples 6 to 12. The crystallinity, measured as the heat of fusion, for an EPDM elastomer produced in accordance with the invention is less than 0.05 cal/g when the ethylene content is less than 55 weight percent. When the EPDM elastomer is produced to have an ethylene content greater than 55 weight percent (as determined by proton NMR) the heat of fusion is in all cases less than 0.2 (E-55) cal/g wherein E is the measured weight percent of ethylene in the EPDM elastomer. In most cases an EPDM elastomer produced in accordance with the invention will have a heat of fusion less than 0.15 (E-55). In comparison, EPDM elastomers produced using an unbridged catalyst species, such as a bis(tetrahydroindenyl) zirconium dichloride based catalyst of comparative Examples 6 to 12, have a heat of fusion in all cases greater than 0.20 (E-55).

As illustrated by the foregoing examples the process of the invention provides a commercially attractive method for production of high molecular weight low crystallinity EPDM elastomers having moderate to high levels of incorporated diene. With the process of the invention diene may be incorporated in amounts greater that 0.5 wt %, preferably greater than 3 wt %, while using relatively low concentrations of the diene monomer. This capability of the process is most pronounced with regards to ENB as the diene. As illustrated by the Examples 27-30, addition of ENB in the amount of roughly 1% by volume in the reactor is sufficient to provide an EPDM elastomer having ENB incorporated to 4 wt %.

Such small amounts of ENB exert little if any suppressing effect on the activity of the catalyst, while the level of ENB conversion is often greater than 50%. With approximately 2.5 vol % of ENB in the reactor, as in Example 28, ENB is converted to the extent of about 66% and incorporated to about 9 wt % in the EPDM elastomer product.

Although the invention has been described with reference to its preferred embodiment, those of ordinary skill in the art may appreciate different modes for practice which do not depart from the scope and spirit of the invention as described above or claimed hereafter.

We claim:

1. A process for producing an elastomer having either a weight-average molecular weight greater than 110,000 or a Mooney viscosity (ML₁₊₈ at 127° C.) greater than 10, comprising contacting under slurry or solution polymerization conditions ethylene, a C₃–C₁₆ α-olefin monomer and a non-conjugated diene monomer with a metallocene-alumoxane catalyst system wherein the metallocene is represented by the formula:

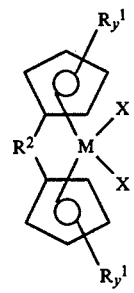

wherein "M" is titanium, zirconium or hafnium; each "R¹" independently is a C₁ to C₂₀ linear, branched or cyclic alkyl group or a C₂ to C₄ alkylene which forms a fused ring system; "R²" is a C₁ to C₆ linear, branched or cyclic alkylene group, an alkyl substituted silanylene group or an alkyl substituted silaalkylene group; each "X" independently is a halogen, hydride, alkyl, aryl or chelating group, and "y" is an integer of 2, 3, or 4.

2. A process for producing an elastomer having either a weight-average molecular weight greater than 110,000, or a Mooney viscosity (ML₁₊₈ at 127° C.) greater than 10, comprising contacting under slurry or solution polymerization conditions ethylene, a C₃ to C₁₆ α-olefin monomer and a non-conjugated diene monomer with a metallocene-alumoxane catalyst system wherein the metallocene is represented by the formula:

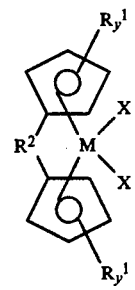

wherein "M" is titanium, zirconium, or hafnium; each "R¹" independently is a C₁ to C₂₀ linear, branched, or cyclic alkyl group or a C₂ to C₄ alkylene which forms a fused ring system; "R²" is a C₁ to C₆ linear, branched, or cyclic alkylene group, an alkyl substituted silanylene group or an alkyl substituted silaalkylene group; each "X" independently is a halogen, hydride, hydrocarbyl radical or chelating group, and "y" is an integer of 2, 3, or 4, and wherein the catalyst is present on a catalyst support material.

3. The process of claim 2, wherein said process is a continuous polymerization process.

4. The process of claim 3, wherein said continuous polymerization process is a slurry process and a hydrocarbon in which said elastomer is substantially insoluble is employed in an amount and under a pressure sufficient to allow utilization of said hydrocarbon in liquified form as a polymerization diluent.

5. The process of claim 2, wherein said catalyst support material is a silica gel treated with methylalumoxane and zirconium is present in an amount of from about 0.10 to about 1.0 weight percent zirconium metal based on total catalyst weight.

6. The process of claim 2, wherein said metallocene component of the catalyst is a zirconocene.

7. The process of claim 6, wherein the α-olefin monomer is one of propylene and 1-butene.

8. The process of claim 6 wherein zirconium is present in an amount of from about 0.02 to about 5.0 weight percent zirconium metal based on total catalyst weight.

9. The process of claim 6, wherein there exists in the reactor vessel a mole ratio of aluminum to zirconium in the range of 10 to 5,000.

10. The process of claim 6, wherein $R^2$ of the zirconocene component of the catalyst is selected from the group consisting of ethylene and dimethylsilanylene.

11. The process of claim 6, wherein the diene monomer is one or more of the following: 1,4 hexadiene; 5-ethylidene-2-norbornene; 5-methylene-2-norbornene; 5-vinylidene-2-norbornene; or dicyclopentadiene.

12. The process of claim 11, wherein the zirconocene component of the catalyst is of the formula:

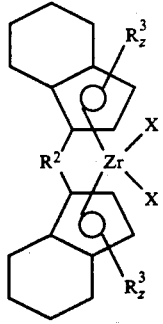

wherein $R^3$ is a $C_1$ to $C_{20}$ linear, branched or cyclic alkyl group and "z" is an integer of 0, 1, or 2.

13. A process for producing an elastomer, comprising:
adding a $C_3$–$C_{16}$ α-olefin monomer, in which an elastomer is substantially insoluble, to a reaction vessel in an amount and under pressure sufficient to allow utilization of said α-olefin in liquified form as a polymerization diluent;
supplying non-conjugated diene monomer to said diluent;
adding ethylene to said diluent in an amount sufficient to maintain a desired ethylene/α-olefin ratio in the liquid phase of the reaction vessel; and,
adding to said diluent a metallocene-alumoxane catalyst system wherein the metallocene component of the catalyst is of the formula:

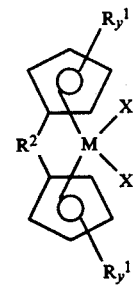

wherein "M" is titanium, zirconium or hafnium; each "$R^1$" independently is a $C_1$ to $C_{20}$ linear, branched or cyclic alkyl group or a $C_2$ to $C_4$ alkylene which forms a fused ring system; "$R^2$" is a $C_1$ to $C_6$ linear branched or cyclic alkylene group, an alkyl substituted silanylene group or an alkyl substituted silaalkylene group; each "X" independently is a halogen, hydride, hydrocarbyl radical or chelating group, and "y" is an integer of 2, 3 or 4;
reacting the mixture of monomers for a time sufficient to permit polymerization of said ethylene, α-olefin, and diene monomers to an elastomer having either a weight-average molecular weight greater than 110,000 or a Mooney viscosity ($ML_{1+8}$ at 127° C.) greater than 10.

14. The process of claim 1, wherein the metallocene component of the catalyst is of the formula:

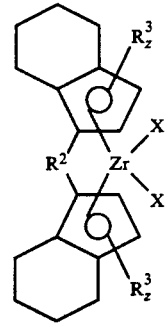

wherein $R^3$ is a $C_1$ to $C_{20}$ linear, branched or cyclic alkyl group and "z" is an integer of 0, 1 or 2.

15. The process of claim 14, wherein $R^2$ of the zirconocene component of the catalyst is ethylene.

16. The process of claim 14, wherein $R^2$ of the zirconocene component of the catalyst is dimethylsilanylene.

17. A process for producing an elastomer, comprising:
adding a $C_3$–$C_{16}$ α-olefin monomer, in which an elastomer is substantially insoluble, to a reaction vessel in an amount and under pressure sufficient to allow utilization of said α-olefin in liquified form as a polymerization diluent;
supplying non-conjugated diene monomer to said diluent;

adding ethylene to said diluent in an amount sufficient to maintain a desired ethylene/α-olefin ratio in the liquid phase of the reaction vessel; and, adding to said diluent a metallocene-alumoxane catalyst system which is partially or wholly supported on a catalyst support material, wherein the metallocene component of the catalyst is of the formula:

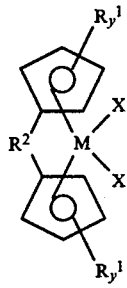

wherein "M" is titanium, zirconium, or hafnium; each "$R^1$" independently is a $C_1$ to $C_{20}$ linear, branched, or cyclic alkyl group or a $C_2$ to $C_4$ alkylene which forms a fused ring system; "$R^2$" is a $C_1$ to $C_6$ linear, branched or cyclic alkylene group, an alkyl substituted silanylene group or an alkyl substituted silaalkylene group; each "X" independently is a halogen, hydride, hydrocarbyl radical or chelating group, and "y" is an integer of 2, 3, or 4;

reacting the mixture of monomers for a time sufficient to permit polymerization of said ethylene, α-olefin, and diene monomers to an elastomer having either a weight-average molecular weight greater than 110,000 or a Mooney viscosity ($ML_{1+8}$ at 127° C.) greater than 10.

18. A process for producing an elastomer, comprising:

adding a $C_3$–$C_{16}$ α-olefin monomer, in which an elastomer is substantially insoluble, to a reaction vessel in an amount and under pressure sufficient to allow utilization of said α-olefin in liquified form as a polymerization diluent;

supplying non-conjugated diene monomer to said diluent;

adding ethylene to said diluent in an amount sufficient to maintain a desired ethylene/α-olefin ratio in the liquid phase of the reaction vessel; and, adding to said diluent a zirconocene-alumoxane catalyst system wherein the zirconocene component of the catalyst is of the formula:

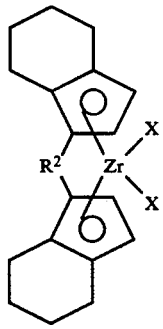

wherein "$R^2$" is a $C_1$ to $C_6$ linear, branched or cyclic alkylene group, and alkyl substituted silanylene group, or an alkyl substituted silaalkylene group; and each "X" independently is a halogen, hydride, alkyl, aryl or chelating group;

reacting the mixture of monomers for a time sufficient to permit polymerization of said ethylene, α-olefin, and diene monomers to an elastomer having either a weight-average molecular weight greater than 110,000 or a Mooney viscosity ($ML_{1+8}$ at 127° C.) greater than 10.

19. The process of claim 18, wherein the α-olefin monomer is propylene and the diene monomer is one or more of the following: 1,4 hexadiene; 5-ethylidene-2-norbornene; 5-methylene-2-norbornene; 5-vinylidene-2-norbornene; or dicyclopentadiene.

20. The process of claim 18, wherein the α-olefin is propylene.

21. The process of claim 18, wherein the α-olefin is 1-butene.

22. The process of claim 18, wherein $R^2$ of the zirconocene component of the catalyst is ethylene.

23. The process of claim 18, wherein $R^2$ of the zirconocene component of the catalyst is dimethylsilanylene.

24. The process of claim 18, wherein $R^2$ of the zirconocene component of the catalyst is ethylene or dimethylsilanylene and the α-olefin polymerization diluent is maintained at a temperature of from about 20° to about 60° C.

25. A process for producing an elastomer, comprising: adding a $C_3$–$C_{16}$ α-olefin monomer, in which an elastomer is substantially insoluble, to a reaction vessel in an amount and under pressure sufficient to allow utilization of said α-olefin in liquified form as a polymerization diluent;

supplying non-conjugated diene monomer to said diluent;

adding ethylene to said diluent in an amount sufficient to maintain a desired ethylene/α-olefin ratio in the liquid phase of the reaction vessel; and, adding to said diluent a zirconocene-alumoxane catalyst system which is partially or wholly supported on a catalyst support material, wherein the zirconocene component of the catalyst is of the formula:

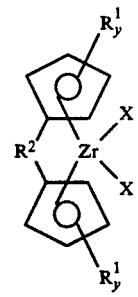

wherein each "$R^1$" independently is a $C_1$ to $C_{20}$ linear, branched, or cyclic alkyl group or a $C_2$ to $C_4$ alkylene which forms a fused ring system; "$R^2$" is a $C_1$ to $C_6$ linear, branched, or cyclic alkylene group, an alkyl substituted silanylene group or an alkyl substituted silaalkylene group; each "X" independently is a halogen, hydride, hydrocarbyl radical or chelating group, and "y" is an integer of 2, 3, or 4;

reacting the mixture of monomers for a time sufficient to permit polymerization of said ethylene, α-olefin, and diene monomers to an elastomer having either a weight-average molecular weight greater than 110,000 or a Mooney viscosity ($ML_{1+8}$ at 127° C.) greater than 10.

26. The process of claim 25, wherein the α-olefin monomer is one of 1-butene or propylene.

27. The process of claim 25, wherein the diene is one or more of the following: 1,4 hexadiene; 5-ethylidene-2-norbornene; 5-methylene-2-norbornene; 5-vinylidene-2-norbornene; or dicyclopentadiene.

28. The process of claim 25, wherein $R^2$ of the zirconocene component of the catalyst is ethylene.

29. The process of claim 25, wherein there exists in the reactor vessel a mole ratio of aluminum to zirconium in the range of 10 to 5,000.

30. The process of claim 25, wherein the polymerization diluent is subjected to an amount of ethylene to maintain a total pressure in the reaction vessel in the range of 10 to 1,000 psi in excess of the combined vapor pressure of the α-olefin and diene monomers.

31. The process of claim 25, wherein the zirconocene component of the catalyst is of the formula:

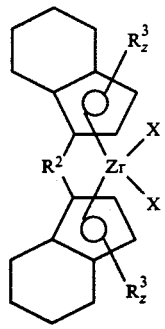

wherein $R^2$ is a $C_1$ to $C_6$ linear, branched, or cyclic alkylene group, an alkyl substituted silanylene group or an alkyl substituted silaalkylene group; each "X" independently is a halogen, hydride, hydrocarbyl radical or chelating group; and $R^3$ is a $C_1$ to $C_{20}$ linear, branched or cyclic alkyl group and "z" is an integer of 0, 1, or 2.

32. The process of claim 25, wherein the zirconocene component of the catalyst is of the formula:

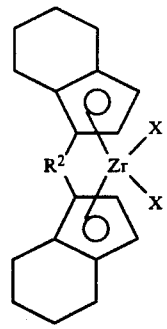

wherein "$R^2$" is a $C_1$ to $C_6$ linear, branched, or cyclic alkylene group, an alkyl substituted silanylene group or an alkyl substituted silaalkylene group; and each "X" independently is a halogen, hydride, hydrocarbyl radical or chelating group.

33. A process for producing an elastomer, comprising the steps of:
adding a $C_3$–$C_{16}$ α-olefin monomer to a reaction vessel in an amount sufficient to serve as a polymerization diluent;
supplying non-conjugated diene monomer to said α-olefin monomer polymerization diluent;
suspending in said α-olefin monomer polymerization diluent a supported zirconocene-alumoxane catalyst system wherein the zirconocene component of the catalyst is of the formula:

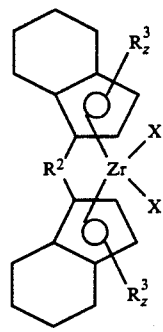

wherein "$R^3$" is a linear or branched hydrocarbyl radical having from 1 to 20 carbon atoms; "z" is an integer number from 0 to 2; $R^2$ bridging group is a linear, branched or cyclic alkylene radical having from one to six carbon atoms or an alkyl substituted silanylene group having from one to two silicon atoms; and each "X" independently is alkyl, aryl, hydride, or halogen;
subjecting said α-olefin polymerization diluent to ethylene in an amount to maintain total pressure in the reaction vessel in excess of the vapor pressure of the α-olefin and diene monomers, and;
maintaining the α-olefin polymerization diluent at a temperature of from about −10° to about 90° C. for a time sufficient to permit copolymerization of said ethylene, α-olefin and diene monomers to an elastomer having a weight-average molecular weight greater than 110,000 and a Mooney viscosity ($ML_{1+8}$ at 127° C.) greater than 10.

* * * * *